Sept. 7, 1948.  P. SCHIDELER ET AL  2,449,040
MANUFACTURE OF HEXAMETHYLENE TETRAMINE
Filed Dec. 30, 1942  3 Sheets-Sheet 1
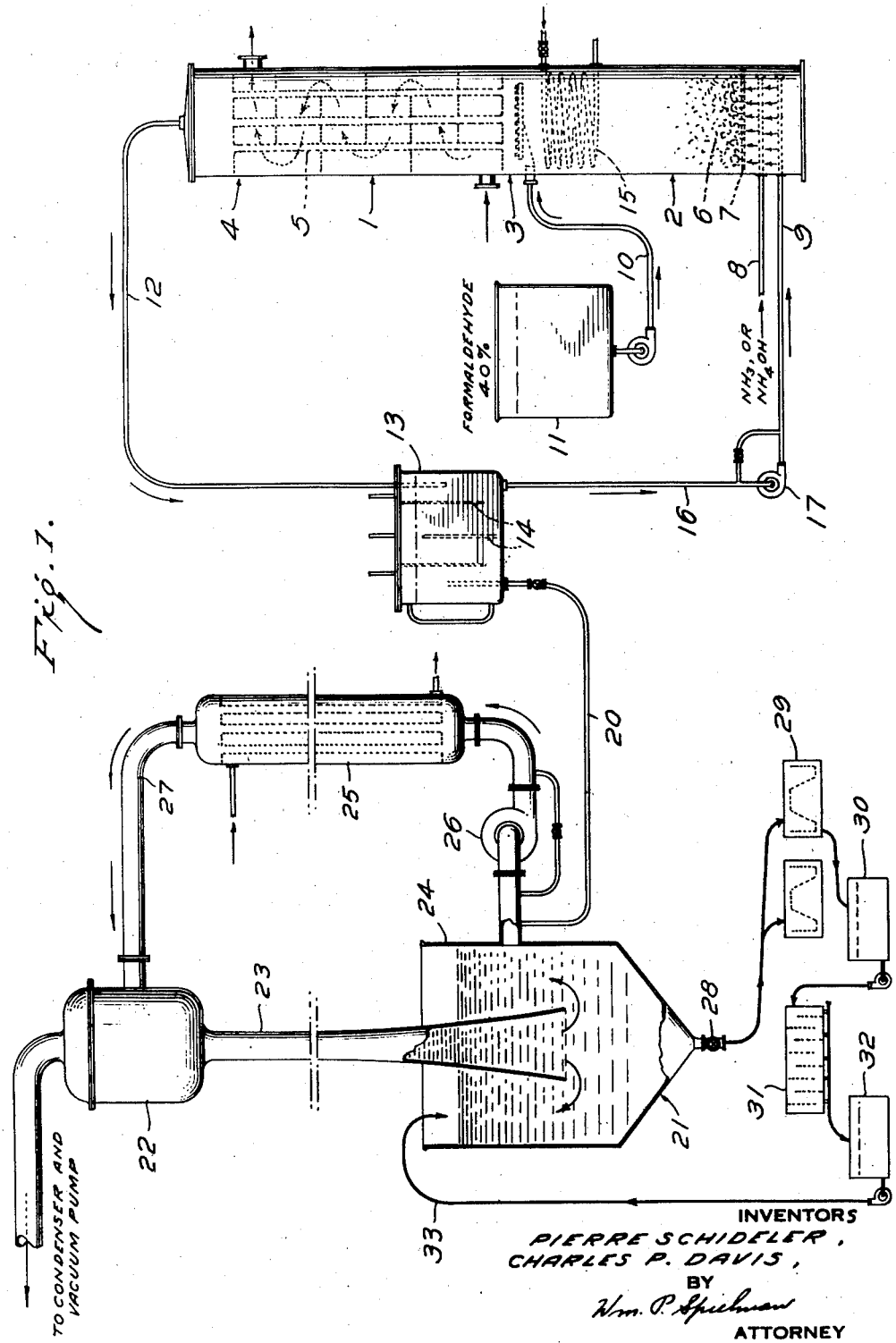
INVENTORS
PIERRE SCHIDELER,
CHARLES P. DAVIS,
BY
Wm. P. Spielman
ATTORNEY

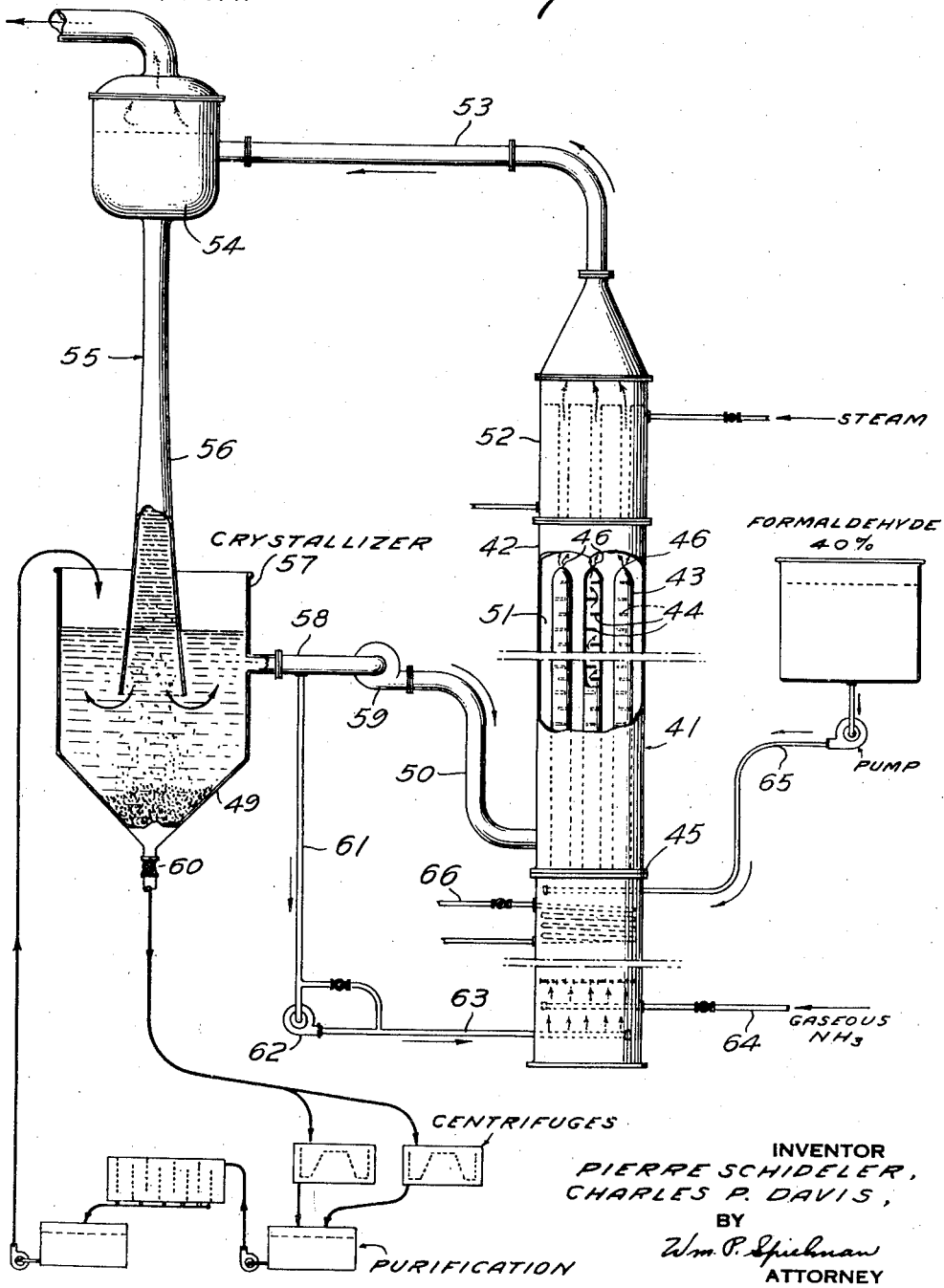

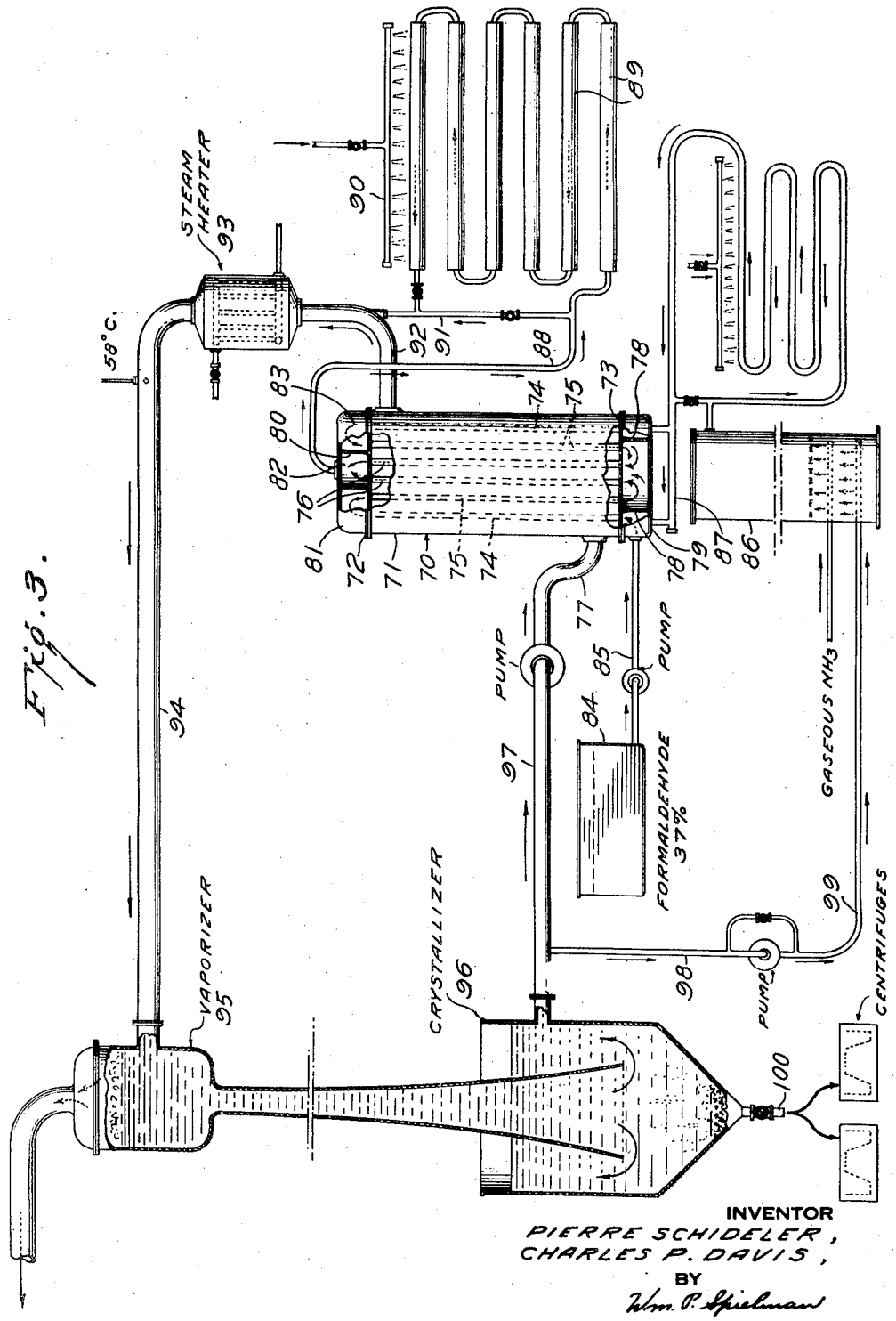

Patented Sept. 7, 1948

2,449,040

UNITED STATES PATENT OFFICE

2,449,040

MANUFACTURE OF HEXAMETHYLENE TETRAMINE

Pierre Schideler, New York, N. Y., and Charles Prescott Davis, Stamford, Conn., assignors to Chemical Construction Corporation, New York, N. Y., a corporation of Delaware Application December 30, 1942, Serial No. 470,593

2 Claims. (Cl. 260—238)

1

This invention relates to a method and apparatus for the production of hexamethylene tetramine and is directed particularly to the large scale manufacture of this material. Hexamethylene tetramine is now used commercially as a curing agent in the molding of phenol-formaldehyde plastics and in the manufacture of explosives, and is therefore produced in large quantities. It is a principal object of the present invention to provide a continuous method and apparatus for hexamethylene tetramine manufacture that can be installed in units of large capacity and operated with a minimum of manual control.

A satisfactory hexamethylene tetramine for use in the manufacture of explosives or pharmaceuticals, must be pure, dry, non-hygroscopic and preferably granular in form. For use in the molding of plastics or in the rubber industry the product must be of uniform purity and of uniform particle size. An additional important object of the invention is the provision of a method and apparatus for the large scale manufacture of a crystalline hexamethylene tetramine product having these important properties.

We have found that the reaction between dissolved formaldehyde and dissolved ammonia takes place very rapidly in an aqueous solution of hexamethylene tetramine at temperatures between 50 and 80° C., particularly if a small excess of ammonia on the order of 2% is used. Although slurries of hexamethylene tetramine crystals cannot be heated safely above about 55° C. without decomposition of the crystals, we have found that hexamethylene tetramine solutions containing little or no crystals can safely be heated to 70° C. for a short time without adversely affecting the purity of the product, and advantage is taken of this discovery in the continuous process of our invention.

In practicing the process of our invention we obtain an efficient control of the reaction temperatures by recirculating a relatively large volume of an aqueous hexamethylene tetramine solution through a reaction zone provided with cooling elements while slowly introducing ammonia and formaldehyde therein so that the violence of the reaction is modified by dilution and the heat generated is taken up by the cooling elements. As a result, we find it is possible to obtain a remarkably pure hexamethylene tetramine product which is easy to dry without decomposition and which contains no unstable byproducts.

On the above basis and from the following description of preferred embodiments it will be seen that our invention in its broader aspects comprises the formation of a hexamethylene tetramine solution by recirculating an aqueous liquid containing ammonia and formaldehyde through a reaction zone at a relatively high velocity in order to dissipate the heat generated by the reaction, while extracting heat from the recirculating liquid within the reaction zone by heat exchanging elements therein. The resulting solution is treated to recover a dry, solid hexamethylene tetramine product, preferably by means of vacuum evaporation of a minor proportion thereof, while all or a portion of the remainder is recirculated back to the reaction zone for the formation of further quantities of hexamethylene tetramine therein after suitable additions of ammonia and formaldehyde have been made. By this method a continuous and closely controlled process is provided that can be practiced on a large scale in equipment that is easily constructed and maintained.

An additional important feature of our invention is the provision of apparatus suitable for carrying out the above-described process. The ammonia and formaldehyde are preferably reacted for the formation of hexamethylene tetramine in a tower or column separated into a lower ammonia addition zone, an intermediate formaldehyde addition zone and an upper reaction zone equipped with suitable heat exchangers for controlling the temperature of the reaction. All or a portion of the hexamethylene tetramine solution from the reaction zone is passed to a low temperature evaporator which is preferably a vacuum evaporator provided with a relatively long barometric leg, through which the concentrated solution may be passed to a crystallizer of any suitable type. Mother liquor from the crystallizer may be mixed with solution from the reaction zone and recirculated through a heater and then directly to the evaporator, or it may be passed through heat exchangers in the reaction zone to absorb heat generated by the reaction. The recirculating liquid introduced into the base of the reaction column for admixture with ammonia and formaldehyde may be taken directly from the reaction zone or a part of the mother liquor from the crystallizer may be employed for this purpose.

The process and apparatus of our invention will be illustrated in greater detail with reference to the accompanying drawings, wherein Fig. 1 is a diagrammatic illustration of a plant designed for the manufacture of hexamethylene tetramine in accordance with one embodiment thereof. Fig. 2 is a similar illustration of a modified process and apparatus utilizing the heat generated by the ammonia-formaldehyde reaction to assist in evaporating the hexamethylene tetramine solution, and Fig. 3 is an illustration of a further modification.

Referring to Fig. 1, the reaction column designated generally by reference numeral 1 consists of a lower ammonia absorption zone 2, an intermediate formaldehyde addition zone 3 and an upper reaction zone 4 provided with water cooled reaction tubes 5. When gaseous ammonia is used the ammonia absorption zone 2 preferably contains packing 6 supported on a perforated grid 7, although this part of the tower can be omitted when aqueous ammonium hydroxide solution is used. The gaseous ammonia or ammonium hydroxide solution is introduced through pipe 8 and the recirculating aqueous liquid through pipe 9. A cooling coil 15 supplied with cooling water is preferably located in the formaldehyde addition zone 3 in order to maintain the temperature of the ascending liquid at about 55° C. in this region. The formaldehyde introduced through pipe 10 into the formaldehyde addition zone 3 mixes with the rising ammonium hydroxide solution and the mixture passes into the reaction tubes 5 wherein the formation of hexamethylene tetramine from the ammonia and formaldehyde is brought to substantial completion. These reaction tubes are cooled by the passage of a stream of cooling water over their external surfaces, and by this means an effective control of the reaction temperatures is maintained within the range of 50-70° C.

The relatively dilute hexamethylene tetramine solution formed in the reaction zone 4 is removed through pipe 12 to a relatively large covered tank 13 provided with baffles 14. In this tank any free formaldehyde is reacted with the excess ammonia in the system. A major proportion of the solution introduced through pipe 12 is continuously withdraw from tank 13 through pipe 16 by means of a recirculating pump 17, which has a large capacity and recirculates a volume of liquid many time greater than the volume of the formaldehyde solution introduced through pipe 10. The consequent dilution materially reduces the violent nature of the ammonia-formaldehyde reaction and results in a minimum formation of undesired by-products in the hexamethylene tetramine formed in the reaction zone.

Solid crystalline hexamethylene tetramine is preferably continuously obtained from the solution in the tank 13 by withdrawing liquid through pipe 20 and introducing it into an evaporating crystallizer 21. Although any suitable evaporating crystallizer adapted for low temperature evaporation may be employed, the apparatus preferably consists of an evaporating chamber 22, a barometric leg 23, and a crystallizing tank 24 of any suitable design, together with a heater 25 for reheating the mother liquor, a recirculating pump 26 and a return line 27 from the heater to the evaporator. The recirculating pump 26 should have a capacity sufficiently large to maintain the recirculating liquid at relatively low temperatures on the order of 55° C. while passing through the heater.

This equipment operates to recirculate a saturated hexamethylene tetramine solution through the crystallizer 24, wherein solid hexamethylene tetramine crystals are deposited and through the evaporator 22 wherein a quantity of water is preferably continuously removed corresponding to that introduced in the fresh formaldehyde solution and in the ammonia solution if aqueous ammonia is used. The heat necessary for the evaporation is supplied by the heater 25, which is preferably a tubular heat exchanger supplied with low pressure steam. Instead of applying heat at this point, it is equally feasible to heat the concentrated solution as its descends in the barometric leg 23 since the water solubility of hexamethylene tetramine decreases slightly with an increase in temperature. By maintaining a relatively high vacuum in the evaporator 22 and a low velocity in the crystallizer this apparatus will produce hexamethylene tetramine crystals of uniform size and composition.

The hexamethylene tetramine crystals are preferably removed from the crystallizer 24 through a discharge line 28. In order to avoid the building up of impurities in the crystallization cycle it is preferable at the same time to withdraw a portion of the mother liquor, which is then separated from the hexamethylene tetramine crystals in the centrifuge 29 and collected in a storage tank 30. Purifying agents may be added to this mother liquor after which it is passed through the filter 31 and reintroduced into the crystallizer by way of tank 32 and return line 33.

A finely divided hexamethylene tetramine of good purity, although relatively difficult to wash and dry, can also be obtained by withdrawing a portion of the concentrated solution from the base of the barometric leg 23 and subjecting it to spray-drying by introducing the solution in finely divided form in countercurrent contact with a rising or revolving stream of heated air or hot products of combustion. In this case the water removed in the evaporator 22 reduces the work of evaporation of the spray drier while the partial concentration obtained by the operation of the concentrating evaporator 21 results in a spray-dried product of improved properties.

In the modification of Fig. 2 provision is made for utilizing the greater part of the heat given off in the ammonia-formaldehyde reaction to assist in vaporizing water in the evaporating concentrator, thereby effecting a material saving of steam in the process. A modified reaction column 41 is employed, wherein the lower part of the reaction zone 42 is provided with a number of vertical reaction tubes 43 provided with internal baffles 44 to increase the agitation of the reacting liquids therein. These tubes are mounted in a tube sheet 45 and are provided with restricted openings 46 in their upper ends. The internal volume of the tubes is such as to bring the ammonia-formaldehyde reaction substantially to completion within the tubes.

An effective control of the temperature of the reaction within the tubes 43 is obtained by maintaining a flow of cold hexamethylene tetramine solution over the outer surfaces thereof. The cooling solution is supplied through a pipe 50, which introduces the cooling liquid into the spaces 51 between the tubes. After absorbing excess heat from the tubes 43 the mother liquor is mixed at the outlets 46 with the hexamethylene tetramine solution formed therein, and the resulting solution is passed through a heater 52 wherein sufficient heat is supplied to evaporate the necessary quantity of water to permit crystallization. The preheated solution is then passed at temperatures of about 55-60° C. through pipe 53 to the evaporating chamber 54 of concentrating evaporator 55. The concentrated solution passes through barometric leg 56 to a crystallizer 57, from which crystals are withdrawn at 60 and a portion of the mother liquor is continuously withdrawn through pipe 58 by pump 59 and recirculated through the pipe 50 into the reaction column 41. A part of the recirculating mother liquor is withdrawn from pipe 58 through pipe 61 and introduced by pump 62 and inlet line 63 into the base of the reaction column 41. Gaseous ammonia is introduced into this liquor through pipe 64 and formaldehyde is introduced through pipe 65, the formaldehyde introduction zone being cooled by a cooling coil 66 as in the modification of Fig. 1.

The modification of Fig. 3 illustrates a combination of the features of Figs. 1 and 2, since cool mother liquor from the crystallizer is used to extract the heat of the ammonia-formaldehyde reaction by indirect heat exchange and is then mixed with the hexamethylene tetramine solution formed thereby. In this figure a tubular reactor 70 is provided, consisting of an outer shell 71 having upper and lower tube sheets 72 and 73 that support three sets of reaction tubes 74, 75 and 76. Mother liquor from the crystallizer is supplied through a pipe 77 to the space surrounding these tubes. A lower cylindrical partition 78 in the bottom header 79 separates the lower ends of tubes 74 from the remaining tubes, while a similar partition 80 divides the upper header 81 into an outlet 82 and a communication chamber 83. Aqueous formaldehyde solution from the tank 84 is introduced into the lower header 79 through pipe 85 and mixes with aqueous ammonia solution prepared in absorber 86 and entering through pipe 87.

The ammonia-formaldehyde mixture passes upwardly through the outer tubes 74, then downwardly through the intermediate tubes 75 and is finally passed upwardly through the central tubes 76 into the outlet chamber 82. By passage of the reacting liquid through these tubes, which are cooled externally by mother liquor entering through the pipe 77, a close and accurate control of the reaction temperature is obtained. In order to bring the reaction to completion the partially reacted mixture from the exist chamber 82 is passed through pipe 88 into a series of finishing tubes 89 which can be partially cooled by a small water spray 90 is desired. The resulting hexamethylene tetramine solution containing no unreacted formaldehyde leaves the finishing tubes 89 through pipe 91 and is mixed with mother liquor leaving the reactor 70 through exit pipe 92. The mixed liquors are then heated in a heater 93 to about 58° C. and are passed through pipe 94 to the vaporizer 95 of a crystallizer 96 which is identical with the crystallizer 55 of Fig. 2. A relatively large flow of mother liquor is withdrawn from this crystallizer through pipe 97 and introduced into the reactor 70 through pipe 77, while a small quantity of the mother liquor is withdrawn through a branch pipe 98 and introduced into the ammonia absorber through pipe 99. Crystals of hexamethylene tetramine are obtained from the discharge line 100 of the crystallizer 96 and are separated from adhering mother liquor in the centrifuges.

What we claim is:

1. A process for the manufacture of hexamethylene tetramine which comprises introducing ammonia and formaldehyde into a rapidly moving aqueous solution containing hexamethylene tetramine, reacting the formaldehyde and ammonia by passing the resulting solution through a cooled reaction zone, concentrating the reacted solution by low temperature evaporation, crystallizing hexamethylene tetramine therefrom, recirculating one portion of the mother liquor through the ammonia and formaldehyde addition zones and through the reaction zone, and passing the remainder of the mother liquor in heat exchange relation with the solution in the reaction zone to extract reaction heat therefrom.

2. A process for the manufacture of hexamethylene tetramine which comprises passing a moving stream of aqueous hexamethylene tetramine mother liquor containing added ammonia and formaldehyde through a cooled reaction zone, passing cold hexamethylene tetramine mother liquid in indirect heat exchange with the reacting solution in said reaction zone to extract heat therefrom, mixing the two solutions, concentrating the mixture by low temperature evaporation of water, crystallizing hexamethylene tetramine therefrom, returning a minor proportion of the resulting mother liquor to the reaction zone and returning the remainder of the mother liquor to the heat exchange step.

PIERRE SCHIDELER.
CHARLES PRESCOTT DAVIS.

REFERENCES CITED

The following references are of record in the file of this patent:

UNITED STATES PATENTS

| Number | Name | Date |
|---|---|---|
| 1,566,820 | Carter | Dec. 22, 1925 |
| 1,774,929 | Landt et al. | Sept. 2, 1930 |
| 1,831,121 | Kermer | Nov. 10, 1931 |
| 2,042,661 | Jeremaissen | June 2, 1936 |
| 2,095,074 | Muus | Oct. 5, 1937 |
| 2,385,200 | Friedel | Sept. 18, 1945 |